June 6, 1950     L. D. CHRISTIE     2,510,555
ARTICLE ORIENTING MEANS
Filed Aug. 30, 1949

INVENTOR.
LEWIS D. CHRISTIE
BY
ATTORNEYS

Patented June 6, 1950

UNITED STATES PATENT OFFICE 2,510,555

ARTICLE ORIENTING MEANS

Lewis D. Christie, Bridgeport, Conn., assignor to Remington Arms Company, Inc., Bridgeport, Conn., a corporation of Delaware Application August 30, 1949, Serial No. 113,194

8 Claims. (Cl. 86—23)

This invention relates to apparatus for securing an orderly arrangement of longitudinally asymmetric articles in uniform positions of orientation. More specifically, the invention contemplates an improved method and equipment for arranging bullets or projectiles heel-down in apertures in a loading plate from which the bullets can be directly transferred to cartridge cases or shells which have been arranged in an identical pattern.

In the loading or assembly of cartridges, it is common practice to arrange primed shells in a pattern of a desired number and configuration and to load the shells so arranged with a powder charge. Bullets are arranged in a similar pattern. The bullet holding plate is superposed over the shells and the bullets are dropped from the loading plate, ready to be pressed into the mouths of the shells. For the purpose of arranging the bullets, an apertured plate is placed on a vibrating frame, sometimes in a slightly inclined position, and a mass of the bullets is caused to flow across the plate. If the bullets are short as compared with their length, it has hitherto been deemed impracticable to cause them to enter the plate apertures heel-down, and hitherto loading plates have been so designed as to secure the nose-down entrance as illustrated in the patent to Huddleson et al., No. 2,413,047. When this is done, it is usually necessary to transfer the bullets to a second plate provided with apertures so chamfered as to receive the shell mouths and to thereby effect the necessary heel-down entrance of the bullets into the shells.

The present invention contemplates an arrangement whereby relatively short bullets may be arranged in a loading plate, heels down, in position for immediate transfer to the shell plate without the necessity for plate inversion or intermediate movement into a transfer plate.

Figure 1:
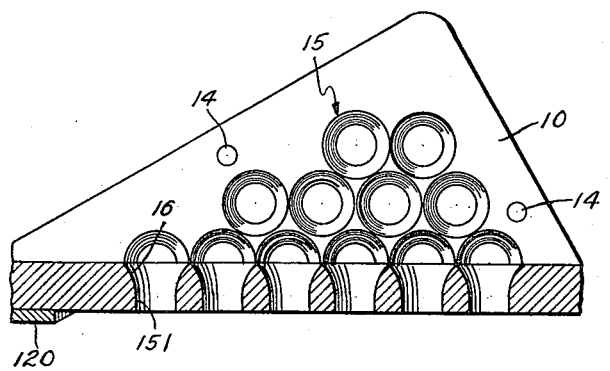
Fig. 1 is an exploded perspective of a fragment of a complete loading plate, embodying one form of the present invention.
Figure 1:
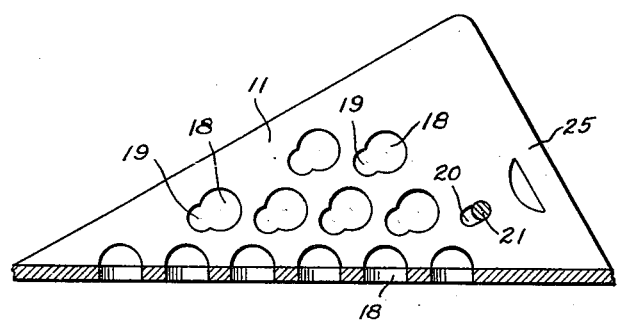
Figure 1:
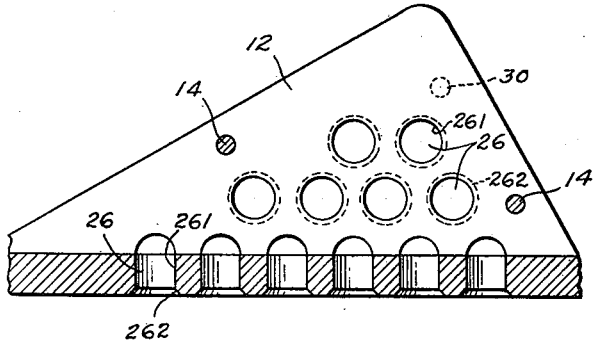
Figure 1:
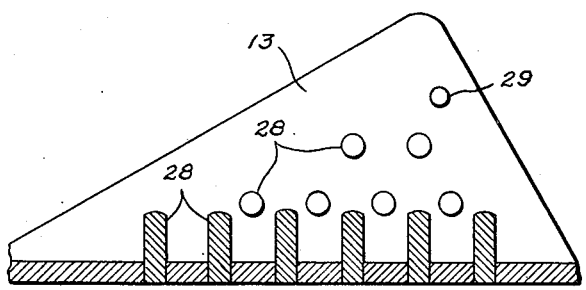

The complete loading plate or assembly comprises an upper receiving plate 10, a stop sheet 11, a lower guide plate 12, and a pin sheet 13, which pin sheet is an important element of the present invention. Secured between the lateral margins of upper plate 10 and lower plate 12 are guide strips 120 defining a passage adapted to receive the relatively movable stop sheet 11. Upper plate 10, guides 120, and lower plate 12 are rigidly secured together by suitable means such as pins or rivets 14, and the assembly is perforated with the desired number and arrangement of bullet receiving openings 15. A fragment only of the plate has been illustrated. An actual production plate may be of any desired size comprising, for example, about 360 openings. The openings 15 of the upper plate 10 comprise cylindrical land portions 151 of such diameter as to loosely receive the maximum diameter of the cylindrical body of the bullets to be arranged. Above the land portion 151 is a substantially widened or flared mouth portion 16 preferably of such peripheral configuration as to merge with the periphery of the land 151. Preferably, also, the flare or taper of mouth portion 16 is such that the intersection of the adjacent mouths at the upper surface of plate 10 leaves a minimum of flat plate area. As illustrated, adjacent mouths are tangent or very nearly tangent to each other.

Figure 2:
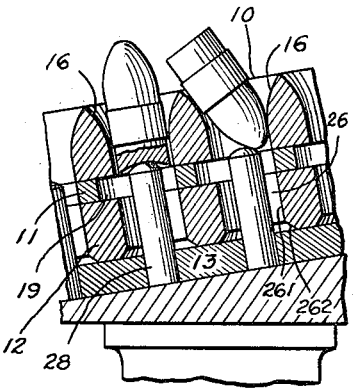
Fig. 2 is a fragmentary sectional elevation of a plate, embodying the present invention mounted on an inclined vibrating platform.
Figure 3:
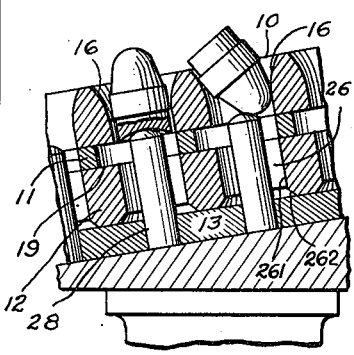
Fig. 3 is similar to Fig. 2 and illustrates the application of the invention to bullets of different proportions.

The stop sheet 11 comprises a set of apertures 18 corresponding to openings 15 in plate 10. Each of these apertures is of substantially keyhole shape and comprises a main portion of a diameter equal to the diameter of the openings 15 and a side portion 19 of smaller diameter adapted when the stop sheet is shifted to effective position to receive the support pins to be described. Movement of the stop sheet is preferably limited by the engagement in a slot 20 therein of a pin 21 projecting into said slot from one of the plates 10 and 12. To facilitate its manipulation, stop sheet 11 may be provided with projecting end portions, one of which is shown as 25. The function of the stop sheet is to hold the bullets in the upper plate 10 while the loaded plate is transferred to a position above the shell plate, in which position it is shifted to release the bullets for passage through the guide plate into the shell mouths. It will be apparent that when the stop sheet is shifted to the right from its Fig. 2 position, it furnishes a support for thus holding the bullets in plate 10 and that when it is in the Fig. 2 position, the passage of the bullets into plate 12 is unobstructed.

The bottom or guide plate 12 comprises a set of openings 26 aligned respectively with the openings in plate 10. These openings comprise long bullet guiding land portions 261 and relatively short chamfered mouth portions 262 having the purpose of receiving and guiding the shell mouths.

The pin mounting sheet 13 is an imperforate plate having secured thereto and projecting upwardly therefrom a set of bullet stop pins 28 associated and aligned respectively with the aligned openings 26 and 15 in the upper and lower plates. Said sheet 13 is provided with suitable positioning means such as studs 29 adapted to be received in apertures 30 in bottom plate 12, whereby each pin 28 is centrally disposed in one of said openings 26—15. Pins 28 are of such length as to project through the apertures 18 in stop sheet 11 and slightly, but only slightly, into openings 15. Although the invention is applicable to any bullet except those having a round or sharply tapered heel, it is particularly adapted to a bullet which comprises a slightly hollow or concave heel. Such a bullet is adapted to rest in an extremely stable position upon the slightly convex end of a pin 28 while held loosely but stably, with its cylindrical body supported against substantial lateral movement in the cylindrical throat 151. However, when a bullet enters one of the openings 15 in the upper plate nose-down position, its rounded nose is thrust laterally by its engagement with the convex end of pin 28, and due to the substantial flare or inclination of mouth portion 16, such bullet occupies a substantially inclined and unstable position permitting a relatively large amplitude of movement and is readily shaken out by the vibration of the plate, probably sometimes assisted by the impact of other bullets flowing across the plate. Thus, bullets which enter the openings heel-down remain in the openings while bullets which enter nose-down are almost immediately dislodged, leaving the openings empty and ready to receive and retain a bullet in correct heel-down position.

In use, the plate assembly, including all of the elements above referred to is secured to a mounting adapted to impart a lateral vibration thereto in the manner familiar to the art and loose bullets are allowed to flow or trickle over the face of the plate until all of the openings are properly filled with heel-down bullets. The plate assembly may, with about equal facility, be used in an inclined or in a horizontal position and obviously a plurality of plates may be simultaneously so mounted and filled.

The best mode of operation seems to require that the vibrating plates be subjected alternately to the flow of bullets and to the cleaning action of a roating fiber brush slowly traversed across the surface of the plate to assist in removing loose bullets and the occasional nose-down bullet. Such a brush, however, has been shown to have virtually no effect upon properly seated heel-down bullets. After two or more of such cycles, the openings in the plates will substantially all be found filled with correctly positioned heel-down bullets.

A brief visual inspection serves to verify that the plate is properly filled and any necessary minor corrections may be made manually. The stop sheet 11 may then be moved to the right to partially obstruct the plate openings and the filled plate removed from pin sheet 13 and transferred to the bullet seating operation.

As is the usual practice, a loading plate provided with similarly spaced openings, each filled with a primed and charged cartridge case, will be positioned in the bullet seating press. This plate will be provided with pins similar to the pins 29 on the pin sheet which insure that the filled bullet plate assembly will be properly positioned thereon. The stop sheet 11 may then be moved to the left to clear the plate openings and the seating punches allowed to descend and carry the bullets into the cartridge cases.

Although my invention has been fairly specifically illustrated and described herein, I do not intend that my invention be considered limited to the exact structure shown, as mechanically equivalent structures will produce equivalent results. For an exact definition of the limits of my invention, reference may be made to the claims appended hereto.

I claim:

1. Apparatus for orienting into heel-down position a plurality of bullets, each bullet comprising a substantially cylindrical body terminating at one end in a transversely disposed heel not projecting substantially beyond the periphery of said body and merging at the opposite end with an ogival nose portion of progressively reduced diameter; said apparatus comprising a plate having therein a plurality of similar openings each comprising a cylindrical portion adapted to receive and laterally support the cylindrical body of a bullet, said cylindrical portion of the opening merging with a mouth portion of progressively increasing diameter; bullet support means of relatively small area centrally disposed beneath each of said openings; and means to impart lateral vibration to said plate and support means whereby loose bullets trickling over said plate will be stably seated heel-down in said openings and bullets entering said openings in nose-down position will be shaken from said openings.

2. Apparatus as described in claim 1, said bullet support means comprising pins of such transverse dimensions and configuration and so disposed in each of said openings as to locate a heel-down bullet in each of said openings with its body in a stable upright position substantially within the cylindrical portion of said opening, and to deflect the nose of a nose-down bullet toward the periphery of said plate opening into an unstable position.

3. Apparatus as described in claim 1, said bullet support means comprising a plurality of pins each having a domed end centrally disposed within the cylindrical portion of one of said openings.

4. Apparatus as described in claim 3 and a pin mounting sheet securable to the said plate in a predetermined position, each of said pins being fixedly secured to said sheet and removable therewith to permit heel first delivery of said bullets from said plate.

5. Apparatus as described in claim 4, said plate being formed to define recessed exits at the opposite end of said cylindrical portion from said mouth portion, said exits being arranged to engage the mouths of supported cartridge cases to guide the bullets thereinto.

6. Apparatus as described in claim 5, said plate having associated with each of said openings releasable stop means arranged to control the passage of bullets from said cylindrical portion to said exits.

7. Apparatus as described in claim 6, said releasable stop means comprising a laterally shiftable sheet formed to define a plurality of apertures which may be positioned in coincidence with the openings in said plate to permit the passage of bullets therethrough.

8. Apparatus as described in claim 7, the apertures in said laterally shiftable sheet being of keyhole shaped conformation, embracing the shanks of said pins in one shiftable position and thus partially obstructing the said plate openings, and in the other position providing clear apertures coincident with said plate openings.

LEWIS D. CHRISTIE.

No references cited.